United States Patent Office.

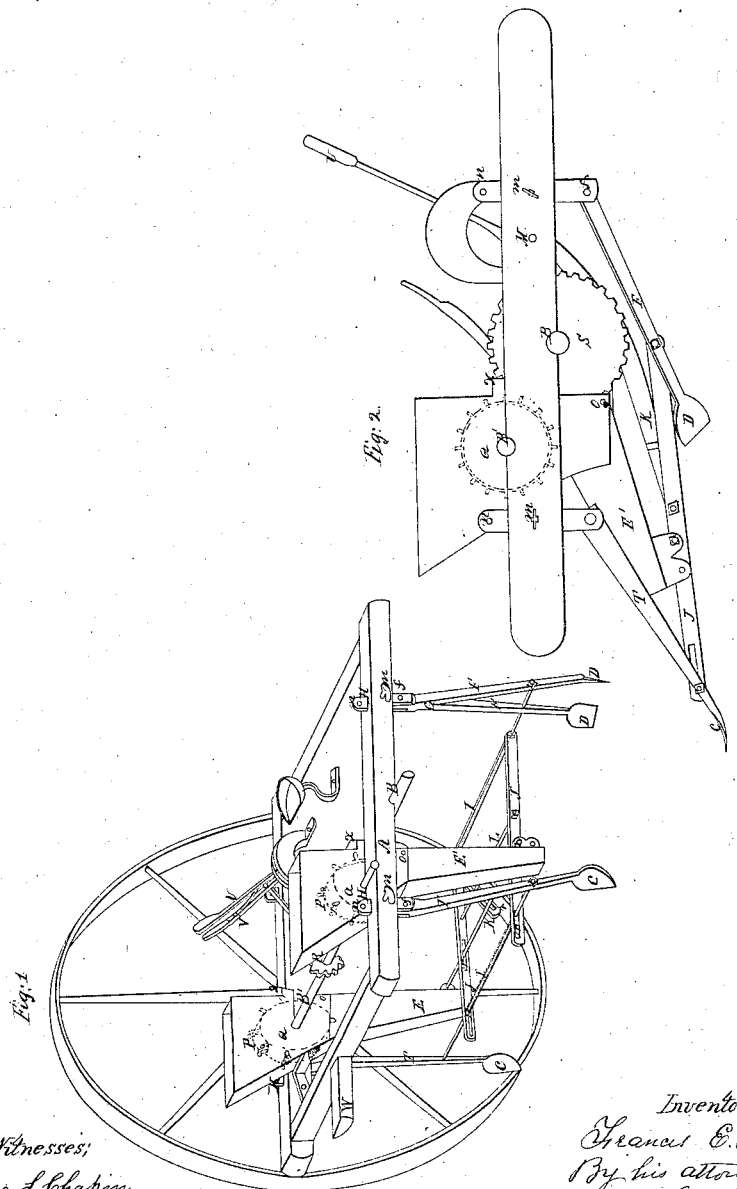

FRANCIS E. MORAN, OF MILLBURN, ILLINOIS.

Letters Patent No. 62,356, dated February 26, 1867.

---

IMPROVEMENT IN COTTON PLANTER.

---

*The Schedule referred to in these Letters Patent and making part of the same.*

---

TO ALL WHOM IT MAY CONCERN:

Be it known that I, F. E. MORAN, of Millburn, in the county of Lake, and State of Illinois, have invented a new and useful Improvement in Machine for Planting Cotton; and I do hereby declare that the following is a full, clear, and exact description of the construction and operation of the same, reference being had to the annexed drawings and letters of reference marked thereon, making a part of this specification, in which—

Figure 1 is a perspective representation of my machine, with one of the wheels removed to give a view of the gearing.

Figure 2 is a longitudinal elevation, with both wheels removed and the shovels and seed-droppers elevated, as when the machine is passing to and from the field, and when passing over obstacles.

The nature of my invention consists in arranging and combining the marking and covering shovels with jointed dropping pipes and a slotted gauge-stop, so that the whole combination may be elevated by means of a common lever and spring stop, in order that the shovels and pipes may be elevated when being conveyed to the field, and also when coming in contact with obstructions; and in enlarging the dropping pipes directly below the seed-separator, for the purpose of preventing the cotton seed from clogging after having been properly separated from the fibres. Great difficulty has been heretofore experienced in devices for properly separating the cotton seed before passing through the conductors to the ground. By the enlargement of the pipes referred to, this difficulty is obviated, for the seed, after being separated by the toothed cylinder, has sufficient room to pass through to the ground freely. The jointed pipes or conductors are necessary, for if constructed otherwise, they could not be elevated; and, as metallic pipes are best for conveying the seed, a similar construction is necessary.

A represents the substantial frame, supported by the axle B, which has mortises for supporting the adjustable marking and covering shovels C D, the opposite covering shovel D'being concealed by the jointed spout E. It will be seen that the covering shovels D are set diagonally, and attached to two prongs F, welded together at G, and having the joint $f$ connecting the prongs F with the adjustable part H, which may be raised or lowered by means of the holes $n$ and pin $m$. P represents the hoppers in which the seed is put; and B' the shaft supported by the frame A, and passing through the hoppers P. This shaft has the pinion R seen at fig. 1, which is operated by the drive-wheel S attached to the axle B, as seen at fig. 2, and also supports the pickers or seed-separators Q, shown by the dotted lines at figs. 1 and 2. These pickers are important for separating the seed from the fibres in order that it may fall evenly upon the ground. J shows slotted bars, adjusted over the rods attached to the parts T F, seen at figs. 1 and 2. K represents a curved bar, having a slot at the lower end, through which the central rod L passes, and is prevented from being carried back by pressure, as the upper end of this bar is attached to the frame A by the pin M. The object of all of the bars J J K is to steady the shovels C D, and prevent them from being forced, by the pressure of earth or obstacles, backward so far as to be inoperative. U V show the common lever and spring used to throw the shovels in and out of gear in the usual manner.

*Operation.*

W shows the tongue to which the power is applied similar to other planting machines. The seed can be put in the boxes or hoppers P, after which the machine can be put in motion, and the shovels C will make the furrows for receiving the seed; and the shovels D will cover it after it has passed through the pipes E E'. When planting seed on rooty or rough ground, only one of the shovels D need be used on the sides of the machine. In the construction shown in the drawings, no provision is made for adjusting the pipes E E' and shovels C D to plant rows of different widths; but this can be accomplished by the use of any of the common devices arranged in the common corn planters.

Having thus fully described my machine, what I claim, and desire to secure by Letters Patent of the United States, is—

1. The arrangement and combination of the diagonal shovels D, marking shovels C, rods L L I, slotted bars J J K, and pipes E E', substantially as set forth.

2. The hoppers P, with enlargements X, in combination with the separators Q, and pipes E E', substantially as set forth.

FRANCIS E. MORAN.

Witnesses:
GEO. L. CHAPIN,
A. HAYWARD.